United States Patent [19]

Holtz

[11] Patent Number: 4,458,914
[45] Date of Patent: Jul. 10, 1984

[54] LUGGAGE CART

[76] Inventor: Gilbert J. Holtz, 182 Tibbetts Rd., Yonkers, N.Y. 10705

[21] Appl. No.: 443,323

[22] Filed: Nov. 22, 1982

[51] Int. Cl.³ .............................................. B62B 1/12
[52] U.S. Cl. .................................... 280/654; 108/13; 108/131; 280/655; 280/47.29
[58] Field of Search ............ 280/652, 654, 655, 47.27, 280/47.28, 47.29, 166; 108/13, 131, 132; 248/240; 24/520, 563, 570

[56] References Cited

U.S. PATENT DOCUMENTS 3,083,066  3/1963  Bedol ............................. 108/131 X
3,241,852  3/1966  Muller et al. ................ 280/47.29 X
3,998,476  12/1976  Kazmark, Sr. ....................... 280/655

Primary Examiner—Joseph F. Peters, Jr.
Assistant Examiner—Michael Mar
Attorney, Agent, or Firm—Bauer & Amer

[57] ABSTRACT

An improved cart for personal use in transporting luggage about airports or the like, in which rotatable components on the luggage-supporting member in one position assist in bearing the weight of the luggage, and in another 180 degree rotated position help clamp the luggage-supporting member against the body of the cart to thereby provide and maintain a compact storage condition in the cart.

3 Claims, 7 Drawing Figures

LUGGAGE CART

The present invention relates generally to luggage carts for personal use at airports or the like, and more particularly to improvements contributing to the weight-supporting function of such carts and also to achieving its compact storage condition when not in use.

As understood, and as exemplified by the luggage cart of U.S. Pat. No. 3,998,476, an important convenience of this product is its ability to fold from its characteristic L-shaped configuration suitable for supporting and transporting suitcases and the like, into a compact condition suitable for storage and ease of carrying. With prior art carts, the folded or compact condition is maintained using elastic cords, and the weight-support capacity thereof is usually a function of its construction materials and structural elements, in that carts intended to be used for heavier loads are merely built stronger and in a more complex manner. In contrast, in the improved cart, clamp-type elements which maintain the compact storage condition of the cart are also useful in assisting in the weight-supporting function of the cart.

Broadly, it is an object of the present invention to provide a personal use-type luggage cart which is easy to carry and store, and yet has significant weight-supporting capacity, and generally otherwise overcomes the foregoing prior art shortcomings and disadvantages.

Specifically, it is an object to maintain in a positive manner, as by clamping, the compact storage condition of the luggage cart, and to use the same clamping means in an effective assisting manner during the weight-supporting service of the cart, so that the clamping means is not merely superfluous structure and weight during use of the cart.

An improved luggage cart demonstrating objects and advantages of the present invention includes an elongated luggage cart body formed of tubular spaced apart opposite sides providing a handle at a proximal end thereof and having wheel means mounted at the distal end thereof. A luggage-supporting member having opposite sides spaced apart the same distance as said opposite sides of said luggage cart body is pivotally mounted at said distal end of the body so as to partake of pivotally transversing movement between an operative luggage-supporting position extending transversely of the luggage cart body and an operative compact storage position in folded relation against the luggage cart body. Rotatably disposed on each said side of said luggage-supporting member are a pair of combination weight-support and clamp members, each of which is embodied with a surface adapted to support weight on one side and has clamp-like projections depending from said other side. As a result, in one selected position of rotation of each said combination member the surface thereon is adapted to be in supporting relation beneath luggage placed on the cart with said depending clamp-like projections in contact with a support surface, and in a 180° position of rotation therefrom said clamp-like projections are then adapted to be in facing relation to the opposite tubular sides of the luggage cart body, and in this position is effective to achieve a clamping engagement with the tubular body sides incident to the folding traverse of the luggage-supporting member against the luggage cart body.

The above brief description, as well as further objects, features and advantages of the present invention, will be more fully appreciated by reference to the following detailed description of a presently preferred, but nonetheless illustrative embodiment in accordance with the present invention when taken in conjunction with the accompanying drawings, wherein.

Luggage carts of the type used for carrying luggage in airports or the like are already well known, one such luggage cart being described and illustrated in U.S. Pat. No. 3,998,476, which is incorporated herein by reference. The referred-to luggage cart, which is intended to be represented by the prior art cart of FIG. 1, offers the convenience of having a compact storage condition from which it can readily assume an operative luggage-supporting condition in what can be characterized as an L-shaped configuration, as illustrated by the cart 10 of FIG. 1. That is, the longer leg of the L-shaped configuration serves as the body of the cart and is comprised of two opposite sides 12, 14 in which there is slidably disposed an upper body portion formed by tubes 16 and 18 connected by a handle 20 to facilitate pushing or pulling the cart 10.

Figures 1, 2:
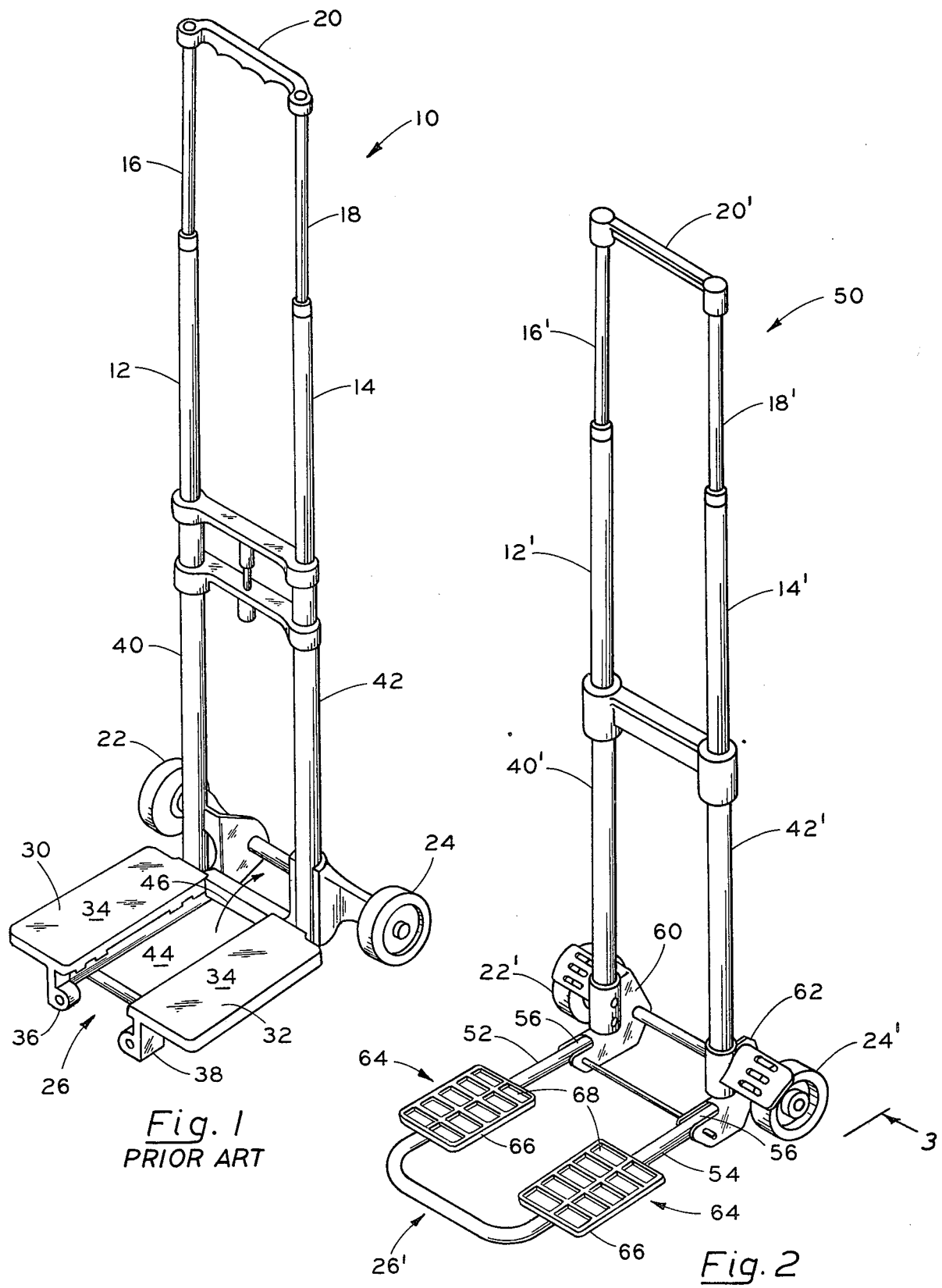
FIG. 1 is a perspective view of a prior art luggage cart of the type to which the improvements of the within invention have been advantageously applied.
FIG. 2 is a perspective view of the improved luggage cart according to the present invention.

Journalled for rotation at the opposite end of the cart body are wheels 22, 24 for moving the cart about. Also pivotally mounted at the same end as the wheels, is a luggage-supporting member generally designated 26. For present purposes, it suffices to note that member 26 includes two rotatably mounted elements 30 and 32 in which, in the operative position illustrated in FIG. 1, are in a weight-supporting orientation or facing relation to any luggage which is placed on the surfaces 34 thereof. Also to be noted is that each of the elements 30, 32 includes a depending foot-like projection respectively designated 36 and 38, which bears against the support surface or pavement, and thus is effective in holding the luggage-supporting member 26 in a slightly elevated or clearance position above the pavement, all as is well understood and described in detail in U.S. Pat. No. 3,998,476.

Still referring to FIG. 1, when it is desired to place the cart 10 in its compact storage condition, the tubes 16 and 18 are inserted within the slightly larger cylindrical tubes 12 and 14, and said tubes 12 and 14 are in turn inserted or telescoped within slightly larger cylindrical tubes 40 and 42. In this way, the body of the cart 10 is reduced to an optimum minimum size. With respect to the luggage-supporting member 26, element 32 is rotated from the position illustrated into the space 44, and then the other element 34 is rotated on top of it, so that the luggage-supporting member 26 is also adapted to assume an optimum minimum size contributing to a compact storage condition in the cart 10. The luggage-supporting member 26 in its folded or compact condition as just described, is then pivoted about an axis, as along the path 46, into a position adjacent the lower body tubular portions 40 and 42.

Thus far, what has been described, as already noted, is well known from the disclosure and illustration of the luggage cart as set forth in U.S. Pat. No. 3,998,476. What will now be described are improvements which are particularly advantageously applied to a luggage cart as just generally described. These improvements and the luggage cart utilizing these improvements are more particularly illustrated in FIGS. 2-6, wherein the same structural features referred to and illustrated in FIG. 1 are designated by the same but primed reference numerals. That is, the improved luggage cart, generally designated 50, has many of the structural features already described and which are designated by the primed reference numerals, and also includes additional structural features which greatly contribute to the utility of the cart, all as will now be described in detail.

In cart 50 the luggage-supporting member 26' is in the specific form of a U-shaped element that is cylindrical in cross-section, thereby providing two opposite sides 52 and 54 which are advantageously circular, for reasons which will soon be explained. Adjacent the ends of the sides 52 and 54, as at 56, the luggage-supporting member 26' is mounted for pivotally traversing movement about an axis 58 which at its opposite ends are, in turn, mounted in brackets 60 and 62 secured adjacent the ends of the tubular body portions 40' and 42'. As a result, and as is perhaps most clearly shown in FIG. 3, the luggage-supporting member 26' is movable from its laterally extending position, in which it supports luggage and the like as illustrated in full line in FIG. 3, through a pivotal transverse 46', as demonstrated by the progressive positions of movement illustrated in phantom perspective in FIG. 3, until the luggage-supporting member 26' assumes a position adjacent the tubular body portions 40', 42', which position will be understood to be the compact storage condition of the cart 50' and is more particularly illustrated in FIG. 5. As will now be described in detail, the FIG. 5 storage condition of the luggage-supporting member 26' is advantageously achieved in that said member 26' is actually releasably engaged with the tubular body portions 40' and 42'.

Figure 5:
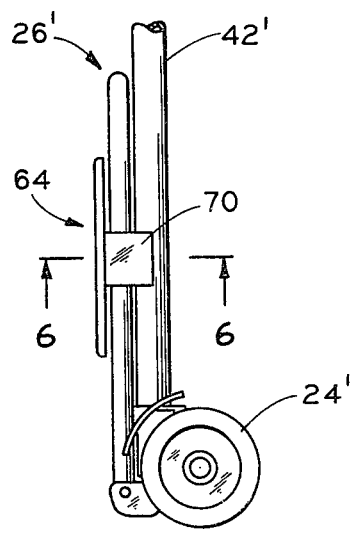
FIG. 5 is a side elevational view illustrating the compact storage condition of the within improved luggage cart.

To achieve the clamping engagement in the compact storage condition as just noted in connection with FIG. 5, use is made of a component 64 which aptly can be characterized as being a combination weight-support and clamp member. Two such components 64 are utilized, each being inserted on a cooperating side 52, 54 prior to the pivotal engagement of the luggage-supporting member 26' to the base of the body of the cart 50. Since the construction of each of the components 64 is identical, the description of one suffices for present purposes and will now be provided. More particularly, each member 64 is comprised of a rectangular body 66 which presents a ridged surface 68 that is appropriate for supporting luggage or other packages thereon. In the position illustrated in FIG. 2, the surfaces 68 are substantially horizontally oriented so that luggage and packages can be conveniently placed thereon.

Figure 3:
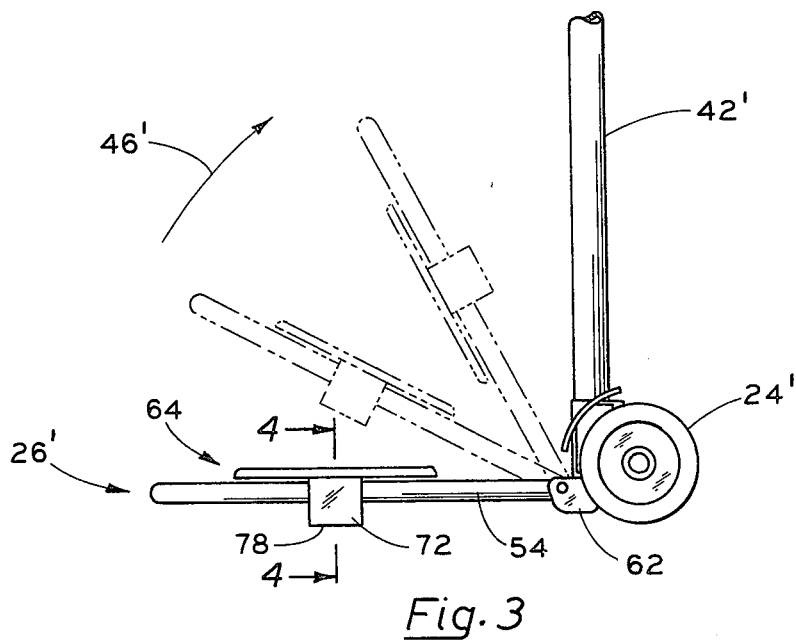
FIG. 3 is a partial side elevational view of the luggage cart of FIG. 2, illustrating the pivotal movement of the luggage support in full-line and phantom-line perspective.
Figure 4:
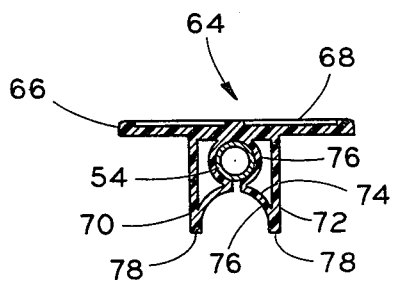
FIG. 4 is a partial sectional view taken along line 4—4 of FIG. 3, showing structural details of a combination weight-support and clamp member in one position of rotation.

Referring now particularly to FIGS. 3 and 4, it will be noted that integrally formed as a part of the surface 68 are a pair of cooperating depending feet-like projections 70 and 72, between which there is an arcuate wall 74 which bounds a corresponding circular compartment designated 76, the purpose of which will soon be apparent. Part of wall 74 is in a specific spherical shape 76 and is adapted to receive one of the cooperating tubular or cylindrical sides 52 or 54 therein. As is perhaps best illustrated in FIG. 4, it should, of course, be apparent that the circular shape of the tubular side 54 and of the wall 76 in encircling relation thereabout results in each member 64 being rotatable about the axis of each of the sides of the luggage-supporting member 26'. Thus, in the FIG. 4 position, the depending projections 70, 72 engage the support surface at their ends, as at 78, and are thus effective in holding the luggage-supporting member 26' in a slightly elevated or clearance position above the pavement or ground support surface on which the cart 50 is being used.

Figure 4A:
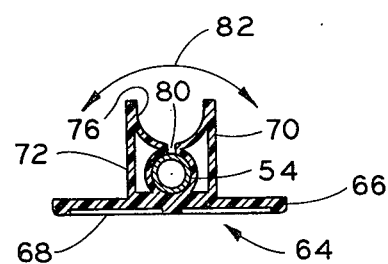
FIG. 4a is a view similar to FIG. 4, but illustrating the weight-support and clamp member in another position of rotation which is 180° of that of FIG. 4.

In preparation of the cart 50 assuming its compact storage position, each member 64 is rotated 180° from its FIG. 4 position into the position more particularly illustrated in FIG. 4a. In said FIG. 4a position, compartment 76 of each member 64 is then in facing relation to one of the tubular sides 40' and 42' of the cart 50. Moreover, projections 70 and 72 are constructed with a slight gap 80 therebetween and of plastic construction material so that there can be a slight outward flexing thereof as illustrated by the double arrow 82. Compartment 76 will be understood to be sized to accommodate the body cylindrical portions 40', 42' and this size selection, together with the slight flexing movement 82 that is possible in the projections 70 and 72, results in each member 64 achieving a clamping engagement to the body portions 40', 42'.

Figure 6:
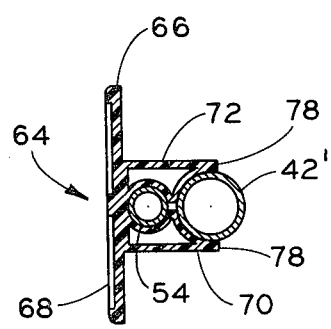
FIG. 6 is a sectional view, taken along line 6—6 of FIG. 5, showing details of the clamping engagement which provides the compact storage condition of FIG. 5.

The clamping function of each component 64, as just noted, can be more particularly understood from FIGS. 5 and 6. The width of the luggage-supporting member 26' is selected so that the opposite sides 52 and 54 respectively align with body tubular bottom portions 40' and 42'. Thus, when the members 64 are rotated with the bottom projections 70 and 72 on each in facing relation with the tubular portions 40' and 42', this correspondingly properly orients each compartment 76 to receive therein a cooperating one of the tubular body portions 40' or 42'. This is illustrated in FIG. 6 wherein it is shown that the projections 70 and 72 are in a snap-fit about the tubular body portion 42'.

When it is desired to use the cart 50 to transport luggage or the like, it is, of course, only necessary to unsnap the clamping feet 70, 72 of each member from about the body tubular portions 40' and 42', and to pivot the luggage-supporting member 26' from its position adjacent the body to a position extending perpendicularly therefrom, as illustrated in FIG. 2. At the end or during the pivotal traverse, and perhaps as is best illustrated in FIG. 3, each member 64 is rotated 180° about its tubular support so that the projections 70 and 72 are then in a depending orientation so that the ends 78 thereof can achieve contact with the pavement or other ground support.

From the foregoing, it should be readily appreciated that there has been described herein an improved luggage cart 50 having novel combination weight-support and clamp members 64 which, in their operative FIG. 2 position, function effectively to support luggage or other packages on the luggage-supporting member 26', and which members 64, when rotated 180°, are also effective in achieving a clamping engagement with the body of the cart 50 which greatly facilitates maintaining the luggage cart in its compact storage condition when not in use.

A latitude of modification, change or substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An improved luggage cart comprising an elongated luggage cart body formed of tubular spaced apart opposite side members providing a handle at a top end thereof and having wheel means mounted at a bottom end thereof, a luggage-supporting member having opposite side members spaced apart the same distance as said tubular opposite side member of said luggage cart body and pivotally mounted at said bottom end of said body for pivotally traversing movement between an operative luggage-supporting position extending transversely of said luggage cart body and an operative compact storage position in folded relation against said luggage cart body, and a pair of combination weight-support and clamp members, one each of said combination members being rotatably disposed on each said side member of said luggage-supporting member, each said combination member having a surface adapted to support weight on one side and clamp-like projections depending from said other side, whereby in one selected position of rotation of each said combination member said surface thereon is adapted to be in supporting relation beneath luggage placed on said cart with said depending clamp-like projections in contact with a support surface, and in a 180° position of rotation therefrom said clamp-like projections are adapted to be in facing relation to said opposite tubular side members of said luggage cart body preparatory to achieving a clamping engagement therewith incident to the folding traverse of said luggage-supporting member against said luggage cart body.

2. An improved luggage cart as claimed in claim 1 wherein said clamp-like projections bound a semi-circular opening therebetween sized to provide a friction fit when snapped about the tubular opposite side members of said luggage cart body.

3. An improved luggage cart as claimed in claim 2 wherein the opposite side members of the luggage-supporting member are cylindrical in cross-section to facilitate the rotatable mounting of the combination members thereon.

* * * * *